US007004353B2

(12) United States Patent
Yamamoto et al.

(10) Patent No.: US 7,004,353 B2
(45) Date of Patent: Feb. 28, 2006

(54) COUNTING AND FEEDING DEVICE FOR SMALL ARTICLE

(75) Inventors: Taizo Yamamoto, Osaka (JP); Akira Nagao, Tenri (JP); Motohiro Yagyu, Nara (JP); Shinichi Ito, Kakamigahara (JP); Fumiyasu Kojima, Gifu (JP)

(73) Assignee: Shionogi Qualicaps Co., Ltd., Yamatokoriyami (JP)

( * ) Notice: Subject to any disclaimer, the term of this patent is extended or adjusted under 35 U.S.C. 154(b) by 190 days.

(21) Appl. No.: 10/467,011

(22) PCT Filed: Feb. 5, 2002

(86) PCT No.: PCT/JP02/00917

§ 371 (c)(1),
(2), (4) Date: Aug. 26, 2003

(87) PCT Pub. No.: WO02/063554

PCT Pub. Date: Aug. 15, 2002

(65) Prior Publication Data

US 2004/0112909 A1 Jun. 17, 2004

(30) Foreign Application Priority Data

Feb. 5, 2001 (JP) ............................ 2001-028506

(51) Int. Cl.
*B65G 59/00* (2006.01)

(52) U.S. Cl. ...................................... 221/277; 221/278

(58) Field of Classification Search .................... 221/9, 221/120, 119, 211, 277, 278, 221; 53/534, 53/539; 198/371, 380
See application file for complete search history.

(56) References Cited

U.S. PATENT DOCUMENTS 4,063,633 A * 12/1977 Hall .......................... 198/455

FOREIGN PATENT DOCUMENTS

| | | | | |
|---|---|---|---|---|
| JP | 63-22301 | A | | 1/1988 |
| JP | 6-329238 | A | | 11/1994 |
| JP | 11-96329 | A | | 4/1999 |
| JP | 11096329 | A | * | 4/1999 |
| JP | 11-301601 | A | | 11/1999 |
| JP | 11301601 | A | * | 11/1999 |
| JP | 2000-247433 | A | | 9/2000 |

* cited by examiner

*Primary Examiner*—Kenneth Noland

(74) *Attorney, Agent, or Firm*—Birch, Stewart, Kolasch & Birch, LLP

(57) ABSTRACT

A counting and feeding apparatus for small article, characterized in that tablets are fed intermittently from a feeding means (2) to the outer peripheral surface of a transfer drum (1) multiple pieces at a time and suckingly held on the outer peripheral surface of the transfer drum (1), a plurality rows of tablets orderly arranged along the circumferential direction of the drum are formed on the outer peripheral surface of the transfer drum (1) and transferred, one tablet is inputted from each of the rows into a temporary reservation means at a specified transfer position, and these steps are repeated specified times, whereby the tablets can be counted for each row, and the specified quantity of tablets can be reserved in the temporary reservation means and then fed to containers or a packing mechanism section.

6 Claims, 14 Drawing Sheets

COUNTING AND FEEDING DEVICE FOR SMALL ARTICLE

This application is the national phase under 35 U.S.C. § 371 of PCT International Application No. PCT/JP02/00917 which has an International filing date of Feb. 5, 2002, which designated the United States of America.

TECHNICAL FIELD

The present invention relates to a counting and feeding apparatus for counting small articles of solid medication such as tablets and capsules and food products of confectionary, supplements and so forth and feeding the small articles successively at a predetermined number into a container such as a packaging container or a packaging bag or to a packaging mechanism section.

BACKGROUND ART

A counting and feeding apparatus is conventionally known which feeds small articles of solid medication or food products subdivisionally in small numbers to packaging containers or packaging bags. For example, a counting, filling and packaging machine which counts and packages a predetermined number of medical tablets is proposed in the official gazette of Japanese Patent Laid-Open No. Sho 63-22301.

The counting and filling apparatus includes, as shown in FIG. 12, four supply feeders b for individually transporting tablets thrown in from hoppers a at a predetermined speed, aligning feeders c provided contiguously with the supply feeders b, and temporary reservation chutes d provided below front end edge portions of the aligning feeders c. The counting and filling apparatus counts the number of tablets dropping from each of the aligning feeders c into a corresponding one of the temporary reservation chutes d, takes out tablets accommodated in each of the hoppers a by every predetermined number and feeds the tablets to a packaging mechanism section.

In particular, the tablets accommodated in each of the hoppers a successively drop onto a corresponding one of the supply feeders b and move at a predetermined speed to a corresponding one of the aligning feeders c by microvibration of the supply feeders b until they are accepted by and aligned in a row into an aligning groove (not shown) formed on the aligning feeder c. Thereafter, the tablets move at a predetermined speed in the aligning groove by microvibration of the aligning feeder c and drop one by one into a corresponding one of the temporary reservation chutes d so that they are reserved in the temporary reservation chute d. At this time, the tablets successively dropping from the aligning feeder c onto the temporary reservation chute d are detected and counted by a sensor k formed from light emitting and receiving elements attached to an upper end portion of the temporary reservation chute d. When the count number of the sensor k reaches a predetermined count number, the supply feeder b and the aligning feeder c are stopped, and a first shutter e provided for the temporary reservation chute d is opened. Consequently, the predetermined number of tablets reserved in each of the temporary reservation chutes d are collected into a rotary measure g through a collecting chute f and fed to the packaging mechanism section (not shown), by which subdivided packaging of them is performed.

If a number of tablets greater than the predetermined number is counted by the sensor k, then a second shutter h is opened in place of the first shutter e and tablets in the temporary reservation chutes d are discharged through a discharge chute j, whereafter the supply feeders b and the aligning feeders c are rendered operative to start counting of tablets again. Consequently, the predetermined number of tablets are collected with certainty from each of the temporary reservation chutes d into the rotary measure g.

In this manner, the counting, filling and packaging machine performs counting of tablets by means of each of four counting mechanism sections each including a hopper a, a supply feeder b, an aligning feeder c and a temporary reservation chute d and feeds a predetermined total number of tablets to the packaging mechanism section. Thus, since the counting mechanism sections can individually count predetermined numbers of different tablets, the counting, filling and packaging machine can package a plurality of different kinds of tablets by every predetermined different numbers into a package. Also it is possible for the counting mechanism sections to count tablets of the same type so that the counting, filling and packaging machine can count a single kind of tablets by a predetermined number.

However, the conventional counting, filling and packaging machine has a low processing capacity from a reason of its mechanism. For example, in such a case where a single kind of tablet is counted by several tens or more and filled into a container such as a bottle so that they are packed into the container, the conventional counting, filling and packaging machine exhibits a very low processing efficiency. In this manner, where a high processing capacity is required, the conventional counting, filling and packaging machine is not suitable for practical use.

In particular, in the counting, filling and packaging machine, when a predetermined number of tablets drop into a temporary reservation chute d, the corresponding supply feeder b and aligning feeder c are merely stopped to stop the feeding of tablets as described above. Therefore, after they are stopped, tablets are likely to drop from the aligning feeder c, resulting in overfeeding of tablets. Particularly where the feeding speed is raised, such overfeeding occurs frequently. Therefore, a high processing capacity cannot be achieved. Further, if overfeeding occurs, then the counting result is reset and the counting is performed again as described above. This also causes a drop in the processing capacity.

In this instance, it is a possible idea to increase the number of counting mechanism sections each including a hopper a, a supply feeder b, an aligning feeder c and a temporary reservation chute d to raise the processing capacity. However, this increases the apparatus scale significantly, and an increase in the number of counting mechanism sections raises the frequency of occurrence of overfeeding described above. Therefore, there is the possibility that the processing capacity may drop conversely.

Further, in the apparatus described above, since tablets are dropped by vibration from the aligning feeders c, the feeding speed of tablets is not always constant. Further, also the timing at which a predetermined number of tablets are fed into the rotary measure g finally is irregular depending upon the presence or the number of times of such re-counting as described above. Therefore, much complicated control is required for the starting/stopping of the supply feeders b and the aligning feeders c, the opening/closing operation of the first shutter e, the movement of the rotary measure g and other related movements. Further, since the timing at which tablets are fed into the rotary measure g is irregular, much complicated control is required to synchronize the packaging mechanism section (not shown) with the feeding timing of tablets and also the probability of the occurrence of failure in packaging is likely to rise.

A counting and filling apparatus shown in FIGS. 13 and 14 is available as an apparatus for counting tablets or capsules by a comparatively great number and filling them into a bottle.

In particular, as shown in FIG. 13, the counting and filling apparatus includes two counting sections a, a, collecting funnels b, b provided individually below the counting sections a, a, secondary reservation pipes c, c attached to the lower ends of the collecting funnels b, b, a communication member e to which the secondary reservation pipes c, c are connected, shutters d, d for openably and closably intercepting the communication member e from the secondary reservation pipes c, c, and a chute f disposed below the communication member e.

In the counting and filling apparatus, a predetermined number of tablets or capsules p (hereinafter referred to as "capsules") counted by each of the counting sections a are reserved into the corresponding secondary reservation pipe c through the corresponding collecting funnel b. Then, the predetermined number of capsules p are fed alternately from the left and the right secondary reservation pipes into a bottle g through the communication member e and the chute f by the opening and closing operations of the shutters d. It is to be noted that the reference character h in FIG. 13 denotes a conveyor belt for transporting the bottle g.

Each of the counting sections a which compose the counting and filling apparatus has a configuration such as shown in FIG. 14. In particular, the counting section a shown includes a capsule feeder a1 having a large number of (15 in the figure) flow paths a6, a photoelectric sensor a2 disposed in the proximity of an end portion of the capsule feeder a1, primary reservation sections a3, a3 disposed on the left and the right below the end portion of the capsule feeder a1, a precise counting reservation section a4 disposed between the primary reservation sections a3, a3, and a primary reservation shutter (not shown) disposed for openably and closably intercepting the collecting funnels b (refer to FIG. 13) from the primary reservation sections a3, a3 and the precise counting reservation section a4 and driven to open and close each by a cylinder a5.

The counting of capsules p by the counting section a is performed in the following manner. In particular, capsules p fed from a hopper (not shown) successively flow along the flow paths a6 of the capsule feeder a1 by microvibration and drop from the ends of the flow paths a6 into the primary reservation sections a3, a3 and the precise counting reservation section a4. Consequently, the capsules p are reserved in the primary reservation sections a3, a3 and the precise counting reservation section a4. At this time, the capsules p dropping from the flow paths a6 into the reservation sections a3, a3 and a4 are counted by the photoelectric sensor a2. At a point of time when a predetermined number of capsules p are reserved in each of the primary reservation sections a3, a3 and the precise counting reservation section a4, the primary reservation shutter (not shown) is opened and the predetermined numbers of capsules p are fed into the secondary reservation pipe c shown in FIG. 13.

In this instance, in the counting sections a, the primary reservation sections a3, a3 perform counting of a major part of the predetermined number to be counted while the precise counting reservation section a4 performs counting of the remaining small number to perform a number adjustment to the predetermined number. In particular, the primary reservation sections a3, a3 perform counting for totaling 14 flow paths a6 from among the 15 flow paths a6, each for seven rows on the left or right and reserves the counted numbers of the capsules p. Meanwhile, the precise counting reservation section a4 performs counting only for the central one of the 15 flow paths a6 and reserves the counted number of the capsules p. For example, in order to count 100 capsules p, the primary reservation sections a3, a3 first count a number of capsules p around 80 (the number varies every time) and feed the approximately 80 capsules p to the secondary reservation pipes c. Then, the remaining number of capsules p around 20 is counted accurately by the precise counting reservation section a4, and the capsules p are fed to the secondary reservation pipes c so that 100 capsules p may be reserved into the secondary reservation pipes c. It is to be noted that, also while the precise counting is performed by the precise counting reservation section a4, the primary reservation sections a3, a3 perform counting of approximately 80 capsules p for the next cycle.

The counting and filling apparatus shown in FIGS. 13 and 14 can count a great number of small articles (capsules) and feed and fill them into bottles or the like comparatively efficiently in this manner. However, since the counting and filling apparatus is configured such that the counting operation for a predetermined number is performed separately by counting of a major part and precision counting, although it can count a great number of small articles efficiently, it exhibits a much deteriorated efficiency in counting for a comparatively small number.

Further, a scraper a7 is attached to the capsule feeder a1 in an opposing relationship to the capsule flow paths a6 as shown in FIG. 14 so that two or more capsules p may not flow in an overlapping relationship. However, even if capsules p flow in a row, if capsules drop from the flow paths a6 in a state wherein they contact with each other or in another state wherein they are very close to each other, then the counting operation by the photoelectric sensor a2 sometimes counts two or more capsules as one capsule. Therefore, the reliability is not necessarily high.

Furthermore, since interception, transportation, feeding and so forth of capsules are controlled by opening and closing operations of the shutter, there is the possibility that a capsule may be broken by the movement of the shutter.

DISCLOSURE OF THE INVENTION

The present invention has been made in view of the circumstances described above, and it is an object of the present invention to provide a counting and feeding apparatus for small articles which can count and feed small articles such as tablets, even when the small articles are packaged in a unit of several tens of pieces into a bottle or a like container and can package the small articles with certainty a comparatively simple mechanism while eliminating a mixture of packages having contents with a wrong number of small articles.

In order to attain the object described above, according to the present invention, there is provided a counting and feeding apparatus for counting small articles such as solid medication or food articles and feeding the small articles successively by a predetermined number into a container such as a packaging container or a packaging bag or to a packaging mechanism section, characterized in that it includes a transport drum for suckingly holding the small articles on an outer peripheral surface thereof and rotating at a predetermined speed to transport the small articles, feeding means for feeding the small articles to the outer peripheral surface of the transport drum, and temporary reservation means for accepting and reserving the small articles from the transport drum and feeding the small articles to the container or packaging mechanism section, and that the feeding means feeds the small articles intermittently and successively by a plural number onto the outer peripheral surface of the transport drum so that the small articles are suckingly held on the outer peripheral surface of the transport drum such that a plurality of rows of the small articles aligned along a circumferential direction of the drum are formed on the outer peripheral surface of the transport drum and then the small articles are transported by rotation the transport drum, whereafter one of the small articles is thrown from each of the rows of the small articles into the temporary reservation means at a predetermined transport position, the series of operations being repeated to count the small articles successively in a unit of the number of rows of the small articles until a predetermined number of small articles are reserved by the temporary reservation means, the reserved small articles being fed into the container or packaging mechanism section.

In particular, according to the counting and feeding apparatus of the present invention, small articles such as solid medication, for example tablets and capsules or food products are suckingly held on the outer peripheral surface of the transport drum such that a plurality of rows of the small articles aligned along a circumferential direction of the drum are formed on the outer peripheral surface of the transport drum and then the small articles are transported by rotation the transport drum. Thereafter, one of the small articles is thrown from each of the rows of the small articles into the temporary reservation means at a predetermined transport position to count the small articles in a unit of the number of rows of the small articles suckingly held on the outer peripheral surface of the transport drum. Then, at a point of time when a predetermined number of small articles is counted, the reserved small articles are fed into a container of a suitable type or a packaging mechanism section from the temporary reservation means.

In this manner, with the counting and feeding apparatus of the present invention, the small articles suckingly held on the outer peripheral surface of the transport drum can be counted in a unit of the number of rows thereof. For example, tablets can be aligned along the circumferential direction on the outer peripheral surface of the transport drum, and ten such tablet rows can be formed to count the tablets in a unit of ten tablets. Even in a case wherein tablets are counted in a unit of several tens and then filled and packaged into a bottle or a like container, they can be counted and fed very efficiently. Further, from the transport drum on which the tablets are suckingly held at equal distances in an aligned state, the tablets are thrown into the temporary reservation means with certainty ten by ten at a fixed speed. Therefore, by feeding the tablets from the temporary reservation means into a container of a suitable type or the packaging mechanism section at a fixed timing, a predetermined number of tablets can be fed with certainty without particularly requiring a complicated counting operation or control. Further, since the tablets are fed at a fixed timing from the temporary reservation means, also the transporting mechanism for containers or the packaging mechanism section may be operated at a fixed speed in accordance with the feeding timing, and no complicated control is required.

As in an embodiment hereinafter described, the counting and feeding apparatus of the present invention may be configured such that a sensor for detecting a small article thrown into the temporary reservation means from each of the rows of the small articles suckingly held on the outer peripheral surface of the transport drum is disposed between the transport drum and the temporary reservation means to inspect a defective count (insufficient feeding).

In this instance, if a number of small articles corresponding to the number of rows of the small articles are not detected and insufficient feeding is detected, then the insufficient small article set may be collected through a separate path from the temporary reservation means without feeding the same from the temporary reservation means to a container or a packaging mechanism section. Preferably, however, also this insufficient small article set is fed in a normal manner to a container or a packaging mechanism section and filled or packed into the container, whereafter it is collected separately from normal products. In particular, where an insufficient product is collected after filling or packaging in this manner, the feeding timing from the temporary reservation means is normally fixed, and also the transporting mechanism for containers or the packaging mechanism section may be operated at a fixed speed. Thus, appearance of a product which contains an insufficient number of small articles can be prevented with certainty without requiring complicated control.

Furthermore, in the counting and feeding apparatus of the present invention, since the small articles are suckingly held on the outer peripheral surface of the transport drum and transported in a stable posture, it is possible to provide one or both of image pickup means for picking up an image of the small articles suckingly held on the outer peripheral surface of the transport drum and a thickness sensor and detect an abnormal appearance of any of the small articles or the thickness of the small articles from the image or thickness data. Consequently, mixture of an article of a different type or mixture of a defective article such as a cracked, broken or some other deformed article or an article to which a foreign article sticks can be prevented. It is to be noted that exclusion of such defective articles may be performed in a similar manner to the removal of products which contain an insufficient number of small articles.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 9(A) is a transverse sectional view and FIG. 9(B) is a vertical sectional view;

BEST MODE FOR CARRYING OUT THE INVENTION

In the following, the present invention is described more particularly with reference to an embodiment of a counting and feeding apparatus of the present invention.

Figure 1:
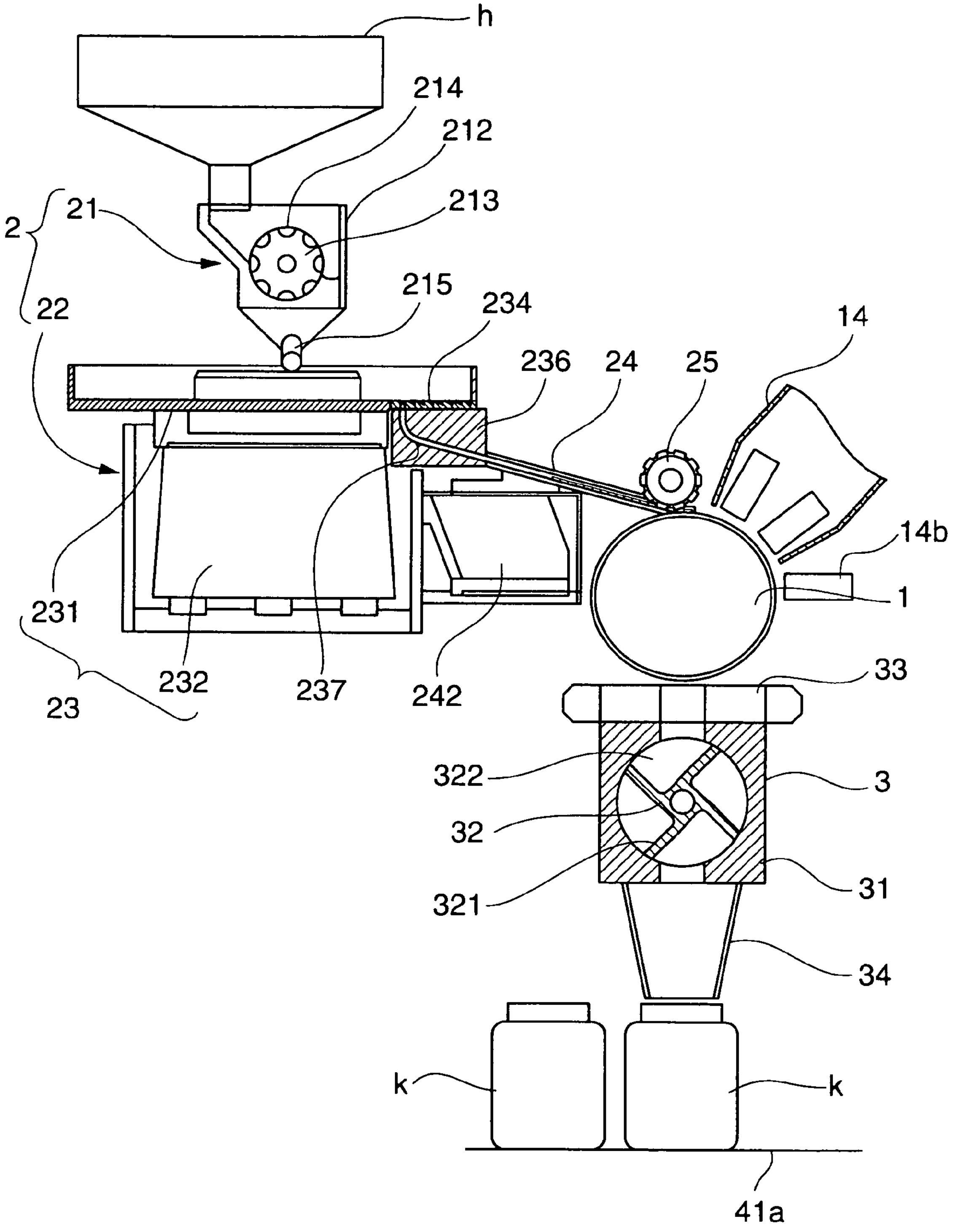
FIG. 1 is a schematic view showing a counting and feeding apparatus according to an embodiment of the present invention.

FIG. 1 shows a counting and feeding apparatus according to an embodiment of the present invention. The counting and feeding apparatus counts tablets for medical use successively by a predetermined number and feeds and fills them into a plastic bottle.

As shown in FIG. 1, the counting and feeding apparatus includes a transport drum 1 for holding and transporting tablets on an outer peripheral surface thereof, a tablet feeding section 2 including a fixed amount feeder 21 for feeding tablets at random by a predetermined number and an aligning feeder 22 for aligning the tablets and feeding tablets at a predetermined speed to the transport drum 1, and a temporary reservoir 3 for accepting tablets from the transport drum 1 and temporarily reserving them.

The fixed amount feeder 21 which composes the tablet feeding section 2 includes, as shown in FIG. 1, a box-shaped case 212 for accepting tablets thrown in from a hopper h and a fixed amount roller 213 disposed for rotation in the case 212. The fixed amount roller 213 has axially extending groove-like recesses 214 formed at a predetermined pitch in a circumferential direction on an outer peripheral surface thereof such that tablets thrown into the case 212 from the hopper h are accommodated into the recesses 214 of the fixed amount roller 213. Thus, when the fixed amount roller 213 rotates at a predetermined speed, a substantially predetermined number of tablets conforming to the volume of the recesses 214 are fed at fixed distances to the aligning feeder 22 through a funnel-shaped chute 215 provided at a lower end portion of the case 212.

The aligning feeder 22 which composes the tablet feeding section 2 includes a vibration feeder 23 which in turn includes a circular vibration disk 231 and a vibrator 232 for applying microvibration to the vibration disk 231.

Figure 2:
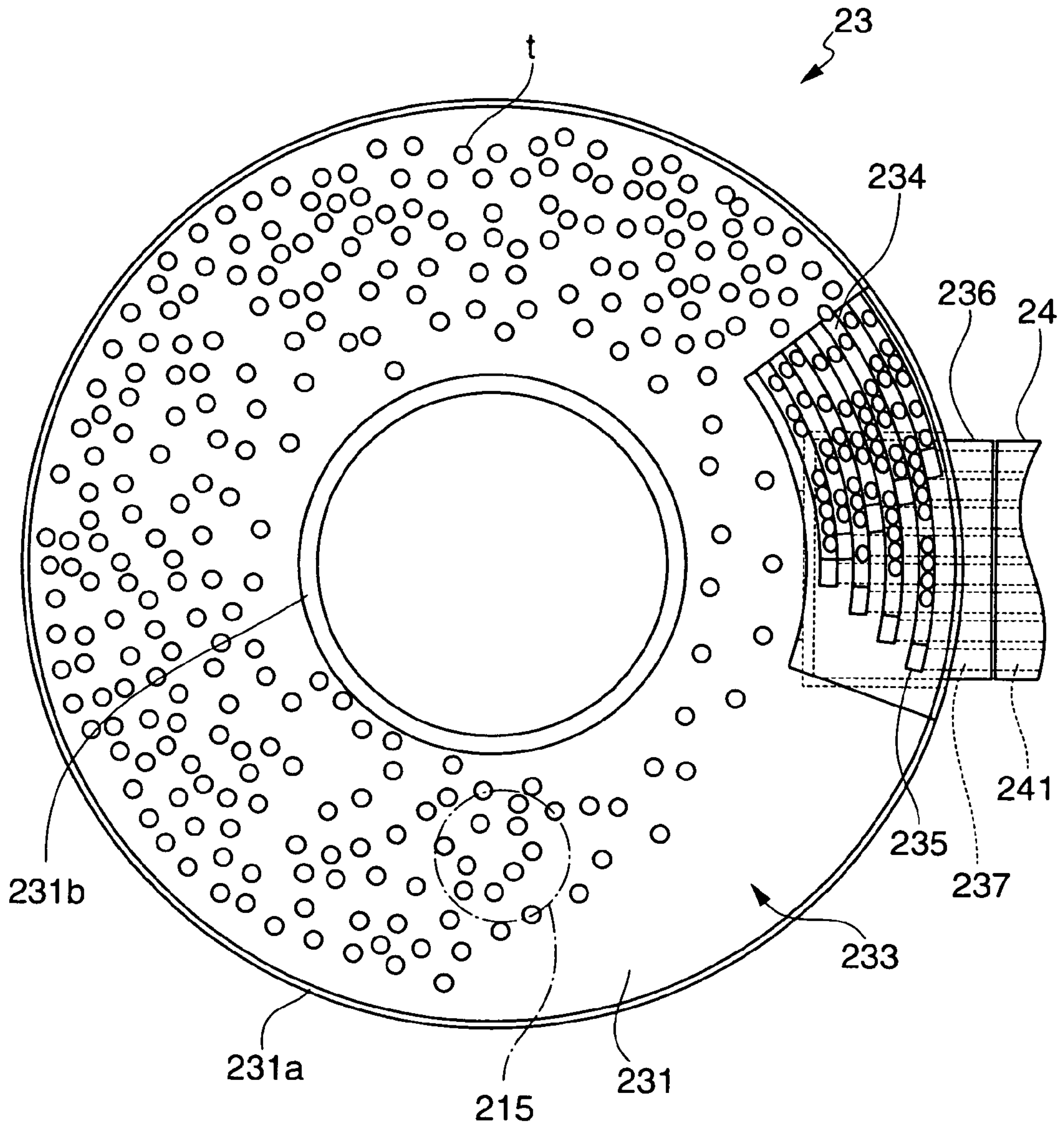
FIG. 2 is a plan view showing a vibration feeder of the counting and feeding apparatus.

The vibration disk 231 which composes the vibration feeder 23 has an outer circumferential wall 231*a* provided uprightly along an outer circumferential edge thereof as shown in FIG. 2. Further, a fixing plate 231*b* in the form of a thick disk is attached to a central portion of the vibration disk 231 and secures the vibration disk 231 to the vibrator 232. A tablet transport section 233 is formed between the fixing plate 231*b* and the outer circumferential wall 231*a* on the vibration disk 231. An end portion of the chute 215 of the tablet feeding section 2 is disposed above the tablet transport section 233.

Eight aligning grooves 234 are provided in a juxtaposed relationship with each other along a circumferential direction at part of the tablet transport section 233 as shown in FIG. 2. The aligning grooves 234 are formed with different lengths with the first ends thereof being registered along a straight line in a diametrical direction while the second ends thereof terminate at different positions relative to each other. The first ends of the aligning grooves 234 registered with each other are open to the upper face of the vibration disk 231. Meanwhile, feed holes 235 are formed at the second or last ends (the other ends) of the aligning grooves 234 such that tablets t can pass therethrough in a vertical direction (in a direction in which a diametrical direction of the tablets t coincides with the upward and downward direction). Further, as shown in FIG. 3, each of the aligning grooves 234 has a cross section of a right-angled triangular shape and has a bottom face inclined obliquely downwardly toward the outer circumference side of the vibration disk 231.

Figure 3:
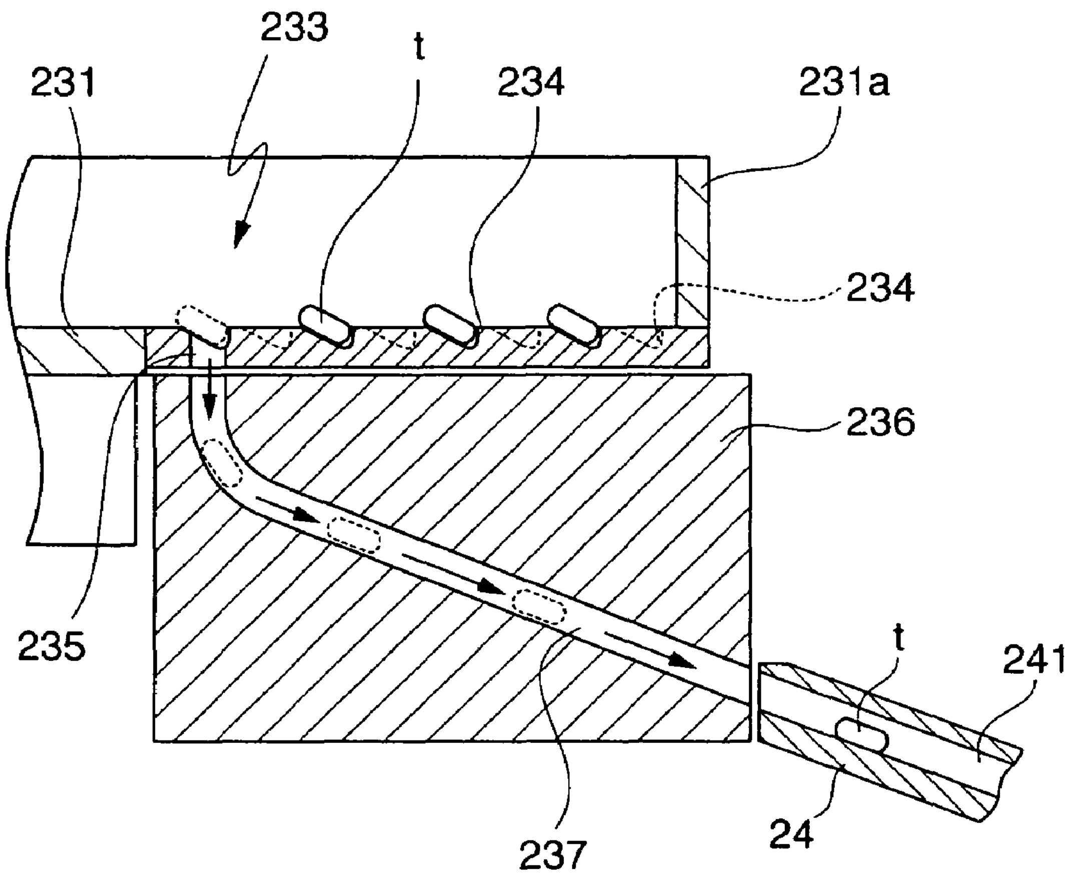
FIG. 3 is a partial enlarged sectional view showing the vibration feeder.

As shown in FIG. 3, a tablet chute 236 in the form of a rectangular block is secured to a location on a lower face of the vibration disk 231 corresponding to the location of the aligning grooves 234. Tablet feeding paths 237 are provided in the tablet chute 236 such that they with the feed holes 235 provided at the terminal ends of the aligning grooves 234 and are open to communicate a lower portion of a side face of the tablet chute 236.

The vibration disk 231 is mounted on the vibrator 232 as shown in FIG. 1 such that it microvibrates by vibration generated by the vibrator 232 in such a manner that it is revolved in the clockwise direction in FIG. 2. Consequently, tablets t fed from the chute 215 of the tablet feeding section 2 onto the tablet transport section 233 are moved to the outer side while being revolved in the clockwise direction on the vibration disk 231.

Figure 4:
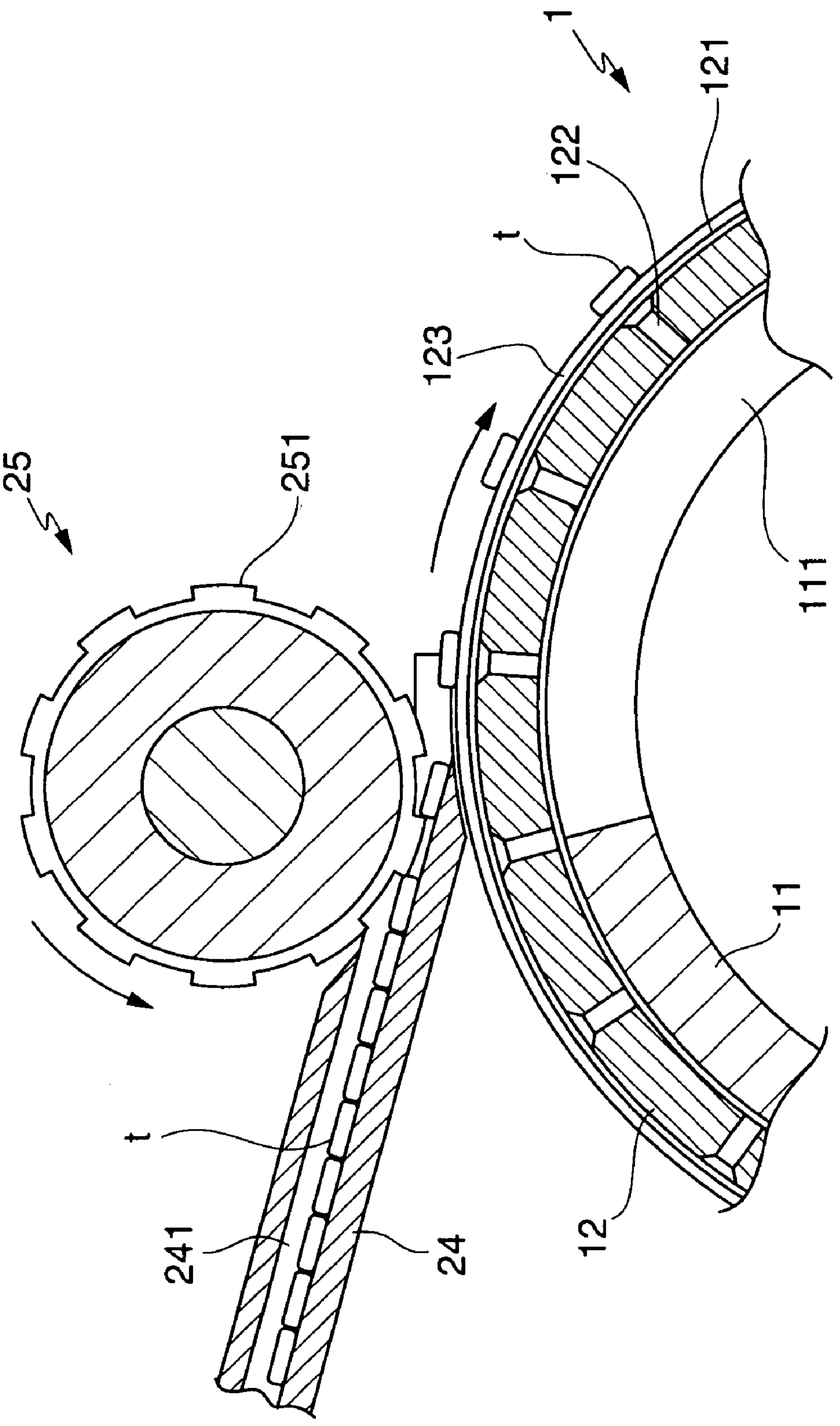
FIG. 4 is a partial enlarged sectional view showing a communication member and a transport drum of the counting and feeding apparatus.

Each of the tablet feeding paths 237 provided in the tablet chute 236 of the vibration feeder 23 is connected at an open end thereof to a communication member 24 as shown in FIGS. 1 and 3. As shown in FIGS. 3 and 4, the communication member 24 is disposed in a downwardly inclined state at a predetermined angle from one end to the other end thereof such that the one end portion thereof is in a non-fixed state in the proximity of the tablet chute 236 while the other end thereof is in the proximity of the outer peripheral surface of the transport drum 1 hereinafter described. The communication member 24 is mounted on the vibrator 242 as shown in FIG. 1 and disposed in such a manner as described above and is caused to microvibrate in the forward and backward directions (lengthwise directions) by the vibrator 242.

As shown in FIGS. 3 and 4, the communication member 24 has communication paths 241 provided thereon corresponding to the tablet feeding paths 237 provided in the tablet chute 236. The other end portions of the communication paths 241 are positioned in the proximity of the outer peripheral surface of the transport drum 1 and partially cut away to open at an upper wall portion thereof as shown in FIG. 4. An outer circumferential portion of a feed roller 25 is partially inserted in the communication paths 241 through the open portion.

As shown in FIG. 4, a plurality of projections 251 formed from a resilient material such as silicon rubber is formed on an outer peripheral surface of the feed roller 25 in a corresponding relationship to the communication paths 241. The projections 251 are inserted in the communication paths 241 of the communication member 24. The projections 251 are provided in an equidistantly spaced relationship from each other along a circumferential direction of the feed roller 25 and are aligned in a row along the circumferential direction and a diametrical direction of the feed roller 25.

Referring to FIGS. 4 to 7, the transport drum 1 includes an inner tube 11 and an outer tube 12 disposed for rotation on an outer side of the inner tube 11. The outer tube 12 continuously rotates at a predetermined speed along an outer circumference of the inner tube 11 in a clockwise direction in FIG. 5 (in the direction indicated by an arrow mark in FIG. 5).

Figure 6:
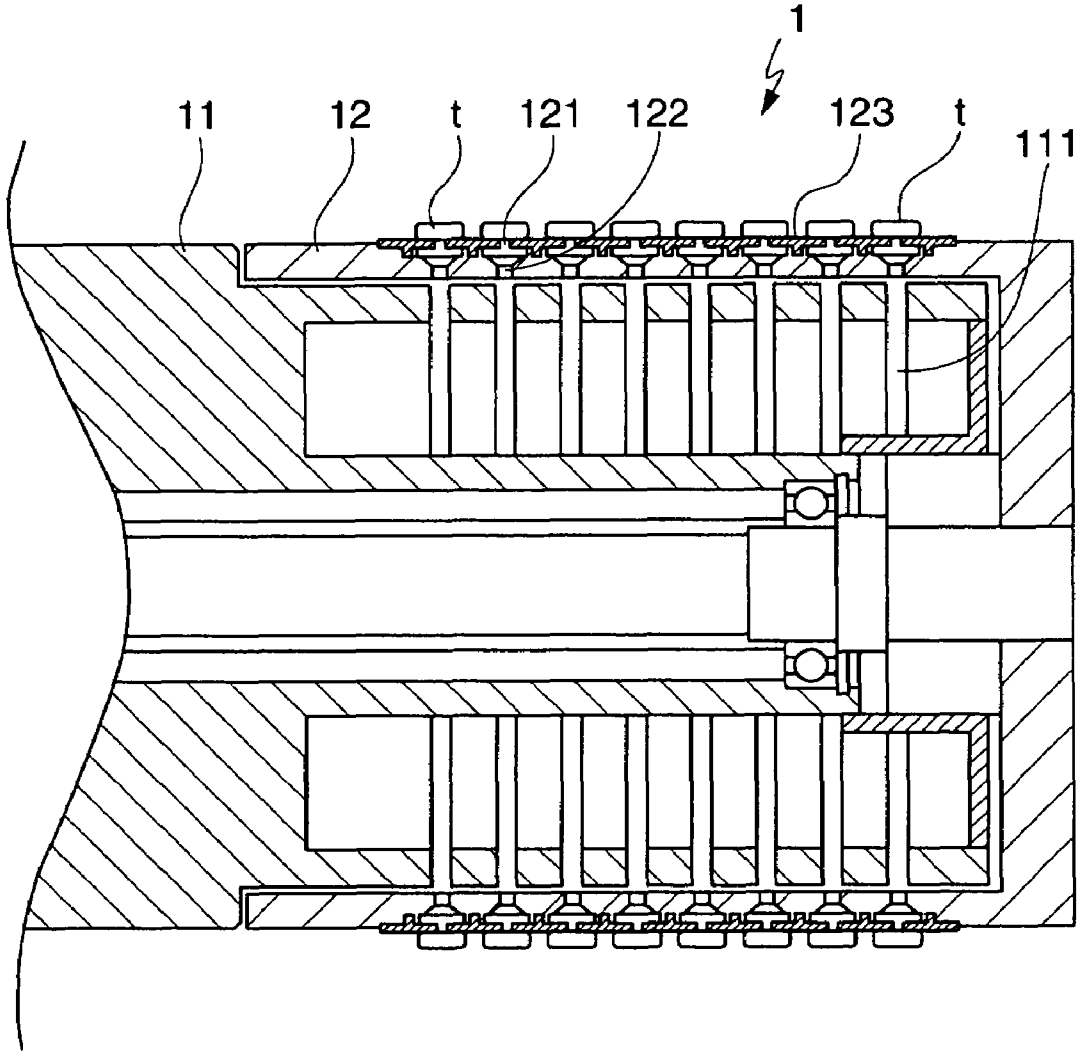
FIG. 6 is a vertical, sectional view showing the drum transport drum.
Figure 7:
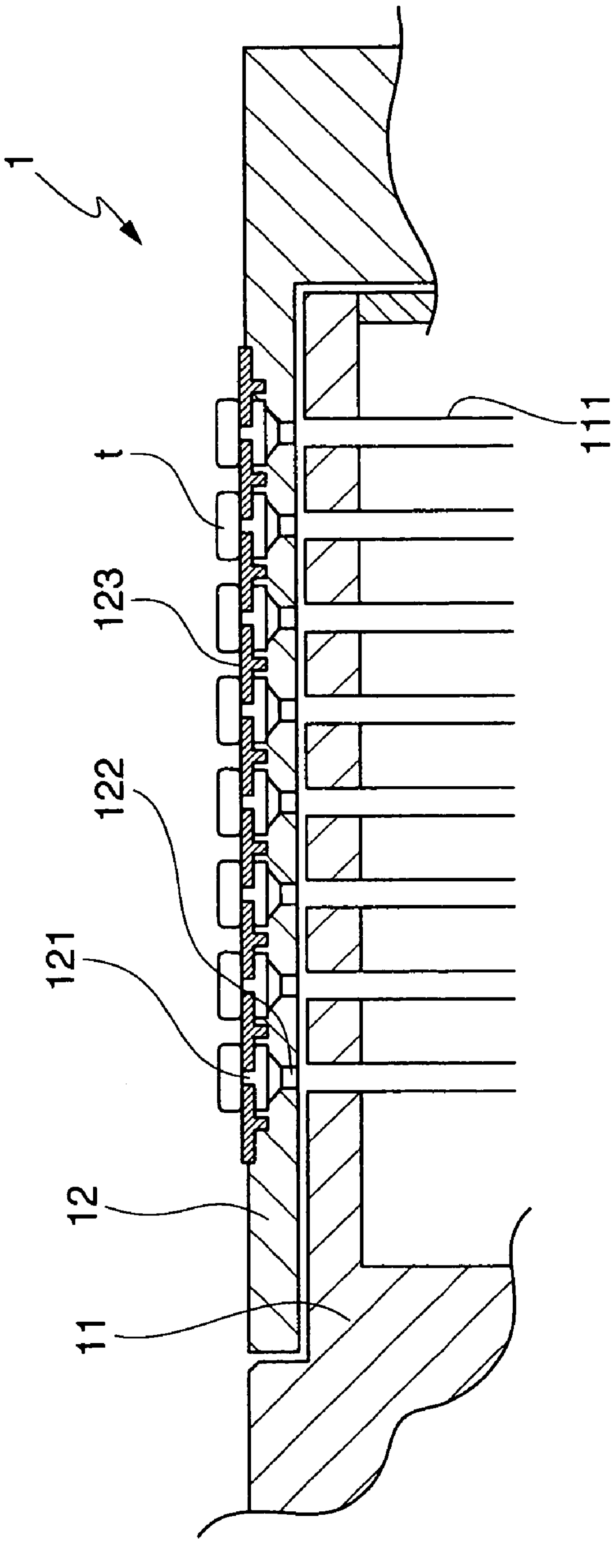
FIG. 7 is a partial enlarged sectional view showing the transport drum.

The inner tube 11 has a through-groove 111 formed along a circumferential direction at a substantially half circumference portion thereof which coincides substantially with a transport region of the tablets t. Meanwhile, as shown in FIGS. 6 and 7, the outer tube 12 has a plurality of (eight in the figures) suction grooves 121 formed in a circumferential direction on an outer peripheral surface thereof. Further, the outer tube 12 has a predetermined number of suction holes 122 formed in a mutually juxtaposed and equidistantly spaced relationship from each other in the circumferential direction in each of the suction grooves 121 thereof. Furthermore, a rubber ring (annular resilient member) 123 having a T-shaped cross section is mounted between each adjacent ones of the suction holes 122 along the opposing side edges of each adjacent ones of the suction grooves 121.

Figure 5:
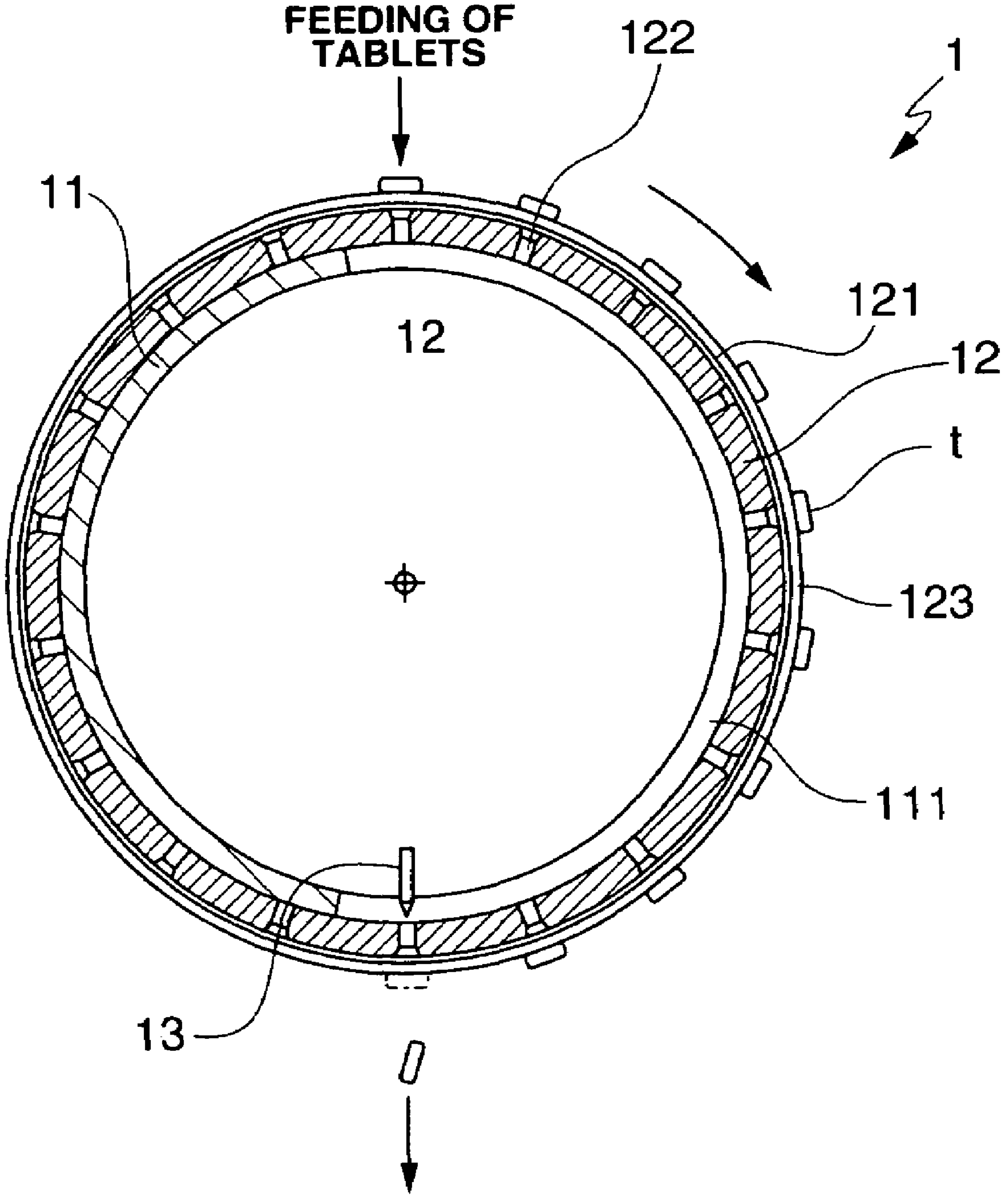
FIG. 5 is a transverse sectional view showing the transport drum of the counting and feeding apparatus.

The inside of the inner tube 11 is normally held in a decompressed state by a sucking action. Thus, in the transport region of the tablets t, the sucking action acts in the insides of the suction grooves 121 from the suction holes 122 of the outer tube 12 through the through-groove 111 to suckingly hold the tablets t on the suction grooves 121 in the outer peripheral surface of the outer tube 12 such that the tablets t extend between the rubber rings 123 during transportation of the tablets t. Compressed air jetting nozzles 13 are disposed at a lowermost portion in the inside of the inner tube 11 as shown in FIG. 5. The compressed air jetting nozzles 13 jet compressed air to eject the tablets t from the outer circumference of the transport drum 1 so that they are thrown into the temporary reservoir 3.

As shown in FIG. 1, the counting and feeding apparatus of the present embodiment includes an image pickup apparatus 14 and a thickness sensor **14*b* disposed in the proximity of the circumferential face of the transport drum 1. The image pickup apparatus 14 picks up an image of tablets t held and transported by the outer peripheral surface of the transport drum 1 and processes the image so that it can detect an abnormal appearance of any of the tablets t. The thickness sensor 14*b*** can measure the thickness of the tablets t. Consequently, mixture of an article of a different type, crack, chip or some other deformation or adhesion of a foreign article can be detected.

Figure 9:
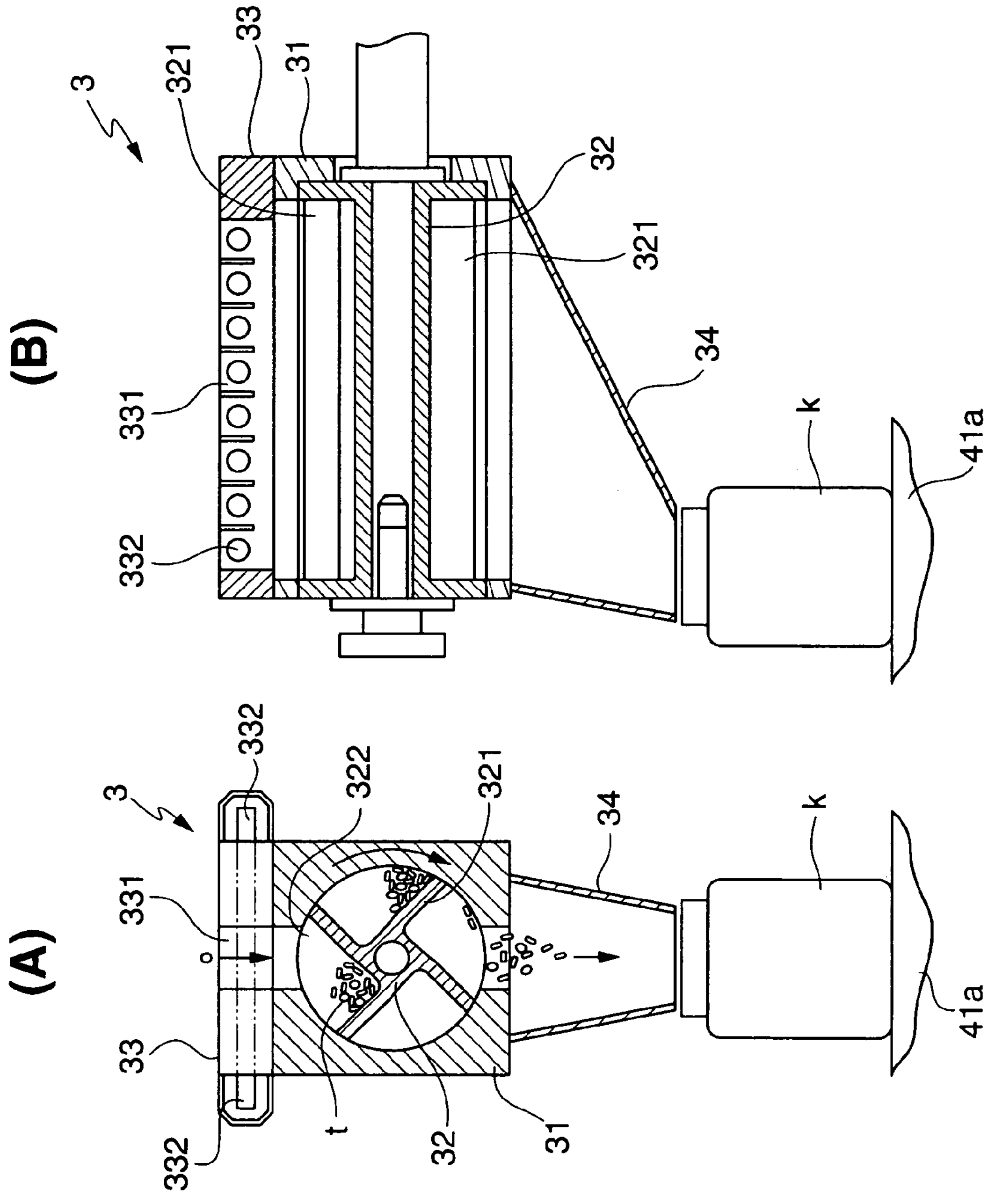
FIG. 9 is a sectional view showing a temporary reservation machine of the counting and feeding apparatus.

Referring now to FIG. 9, the temporary reservoir 3 includes a body 31 in the form of a rectangular block and a rotary member 32 disposed in the body 31. The body 31 has a cylindrical hollow therein and has an opening provided at each of an upper face and a lower face thereof and communicating with the hollow. A gate member 33 is mounted on the upper face of the body 31. The gate member 33 has tablet paths 331 formed therein and partitioned in accordance with the number of the rows of the tablets t formed on the outer peripheral surface of the transport drum 1. The tablet paths 331 are communicated with the upper face opening of the body 31. A sensor 332 composed of a light emitting element and a light receiving element in pair is mounted between each adjacent ones of the partitions so that it detects a tablet t which passes between the partitions. Meanwhile, a funnel-shaped feeding chute 34 is mounted on the lower face of the body 31 such that the tablets t discharged from the lower face opening of the body 31 are thrown into a plastic bottle k disposed below the body 31 through the feeding chute 34.

The rotary member 32 which composes the temporary reservoir 3 includes four partition blades 321 provided at positions thereof displaced by 90 degrees from each other as shown in FIG. 9(A). Consequently, the inside of the hollow of the body 31 is divided into four tablet accommodating sections 322 by the partition blades 321. The rotary member 32 is intermittently rotated by 90 degrees so that the four tablet accommodating sections 322 are rotated 90 degrees in the clockwise direction in FIG. 9(A).

A bottle transporting mechanism section for transporting bottles k into which tablets t should be filled is provided below the temporary reservoir 3.

Figure 10:
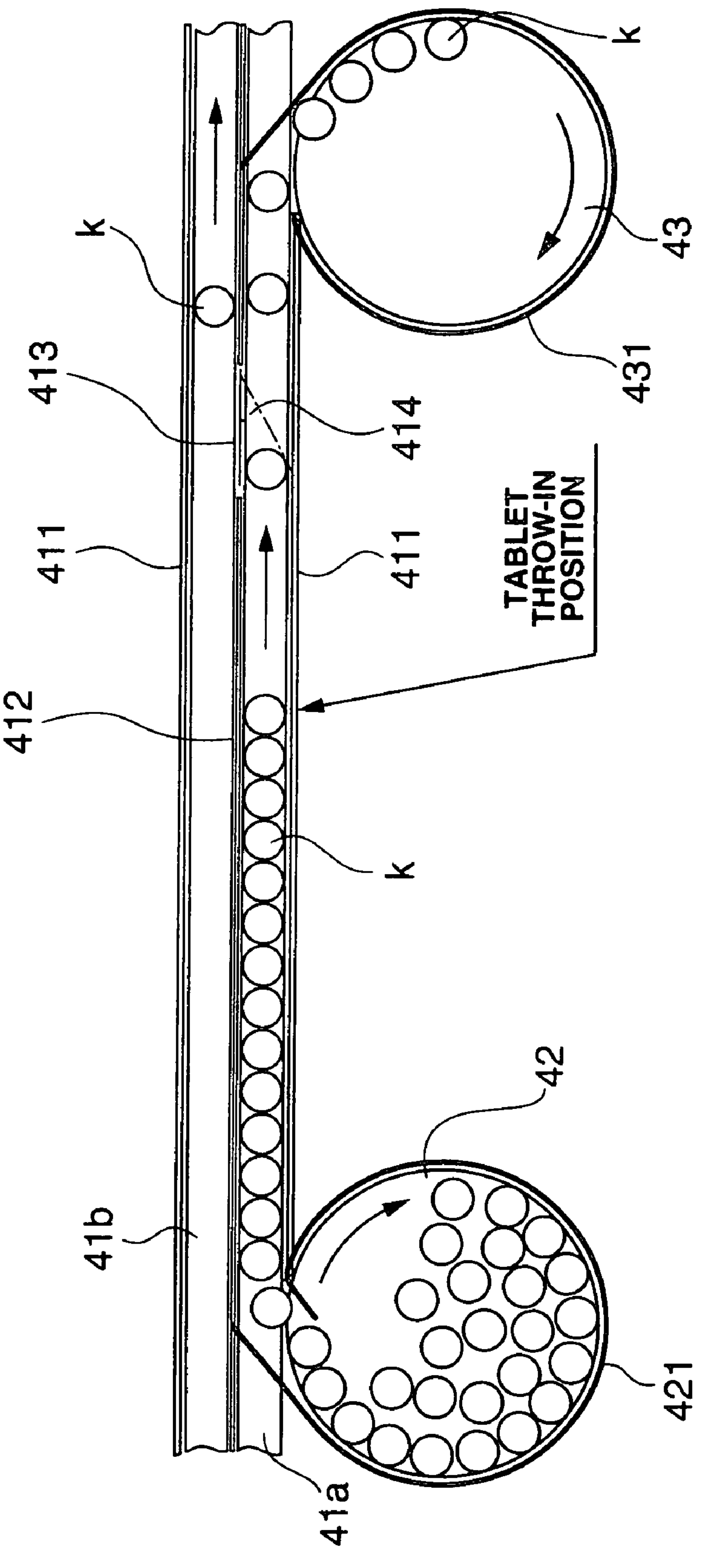
FIG. 10 is a schematic plan view showing a bottle transport mechanism section of the counting apparatus.

Referring to FIG. 10, the bottle transporting mechanism section includes two conveyor belts including a transport conveyor belt **41*a* and a defective article transport conveyor belt 41*b*, a bottle feeding table 42, and a bottle collection table 43**.

The transport conveyor belt **41*a* and the defective article transport conveyor belt 41*b* are provided in a closely juxtaposed relationship with each other and are circulated at a predetermined speed in the same direction (in the rightward direction in FIG. 10). Outer walls 411, 411 are disposed on the outer side portions of the conveyor belts 41*a* and 41*b*, and a partition wall 412 is disposed between the conveyor belts 41*a* and 41*b*. A defective article removing window 413 is formed at a portion of the partition wall 412 such that it communicates the conveyor belts 41*a* and 41*b* with each other. A defective article discharging door 414 is attached to the defective article removing window 413 such that it opens or closes the defective article removing window 413 when it is pivoted to the transport conveyor belt 41*a*** side.

The bottle feeding table 42 is disposed in the proximity of the transport conveyor belt **41*a* at an upstream portion of the transport conveyor belt 41*a* and rotates at a predetermined speed in the clockwise direction in FIG. 10. A peripheral wall 421 is provided on an outer periphery of the bottle feeding table 42. The peripheral wall 421 is partly open to the transport conveyor belt 41*a* and has an end portion extending to a position above the transport conveyor belt 41*a***.

The bottle collection table 43 is provided in the proximity of the transport conveyor belt **41*a* at a downstream portion of the transport conveyor belt 41*a* and rotates at a predetermined speed in the clockwise direction in FIG. 10 similarly to the bottle feeding table 42. A peripheral wall 431 is provided on an outer periphery of the bottle collection table 43. The peripheral wall 431 is partly open to the transport conveyor belt 41*a* and has an end portion extending to a position above the transport conveyor belt 41*a***.

The counting and feeding apparatus counts tablets t thrown in the hopper h successively by a predetermined number and feeds the predetermined number of tablets t into the plastic bottle k. Now, the operation of the counting and feeding apparatus is described.

Tablets t thrown in the hopper h (refer to FIG. 1) are successively thrown into the case 212 of the fixed amount feeder 21. Then, the tablets t are thrown at a predetermined feeding speed into the tablet transport section 233 on the vibration disk 231 of the aligning feeder 22 from the chute 215 successively by a number corresponding to the capacity of the recesses 214 formed on the fixed amount roller 213 by the fixed amount roller 213 which rotates in the case 212.

The tablets t thrown in the tablet transport section 233 on the vibration disk 231 are revolved in the clockwise direction to move toward the outer side as shown in FIG. 2 by vibration of the vibration disk 231. Then, the tablets t advance into the aligning grooves 234 provided at part of the outer circumferential portion of the vibration disk 231 so that they are aligned into 8 rows along the circumferential direction of the vibration disk 231. Thereafter, the tablets t drop from the feeding holes 235 provided at the terminal ends of the aligning grooves 234 into the tablet feeding paths 237 of the tablet chute 236 and advance into the communication paths 241 of the communication member 24 through the tablet feeding paths 237.

In particular, the vibration disk 231 microvibrates in such a manner that it revolves by a small amount as described hereinabove, and the tablets t are revolved to move slowly to the outer side by the vibration until they advance into the aligning grooves 234. Then, as shown in FIG. 3, the tablets t having advanced into the aligning grooves 234 move in a posture obliquely inclined by the inclination of the bottom walls of the aligning grooves 234 to the terminal ends of the aligning grooves 234 by the vibration of the vibration disk 231. Then, the tablets t drop from the feeding holes 235 into the tablet feeding paths 237 of the tablet chute 236 and advance into the communication paths 241 of the communication member 24 through the tablet feeding paths 237.

The tablets t having advanced into the communication paths 241 of the communication member 24 move to the tip end side of the communication member 24 by the inclination of the communication member 24 and the vibration by the vibrator 242 until they contact with and are stopped once by the projections 251 of the feed roller 25 as shown in FIG. 4. Then, by the feed roller 25 rotating at a fixed speed, the tablets t are fed at fixed distances from the end of the communication member 24 onto the suction grooves 121 provided on the outer peripheral surface of the transport drum 1. In this instance, while the eight communication paths 241 are provided on the communication member 24 in a corresponding relationship to the feeding holes 235 provided on the vibration disk 231 as shown in FIG. 2, the tablets t are fed at a time from the communication paths 241 onto the suction grooves 121 on the outer peripheral surface of the transport drum 1. Further, the speed of rotation of the transport drum 1 is adjusted in accordance with the feeding timing of the tablets t by the rotation of the feed roller 25. The tablets t fed by the rotation of the feed roller 25 are placed onto the suction holes 122 of the outer tube 12 which composes the transport drum 1.

Figure 8:
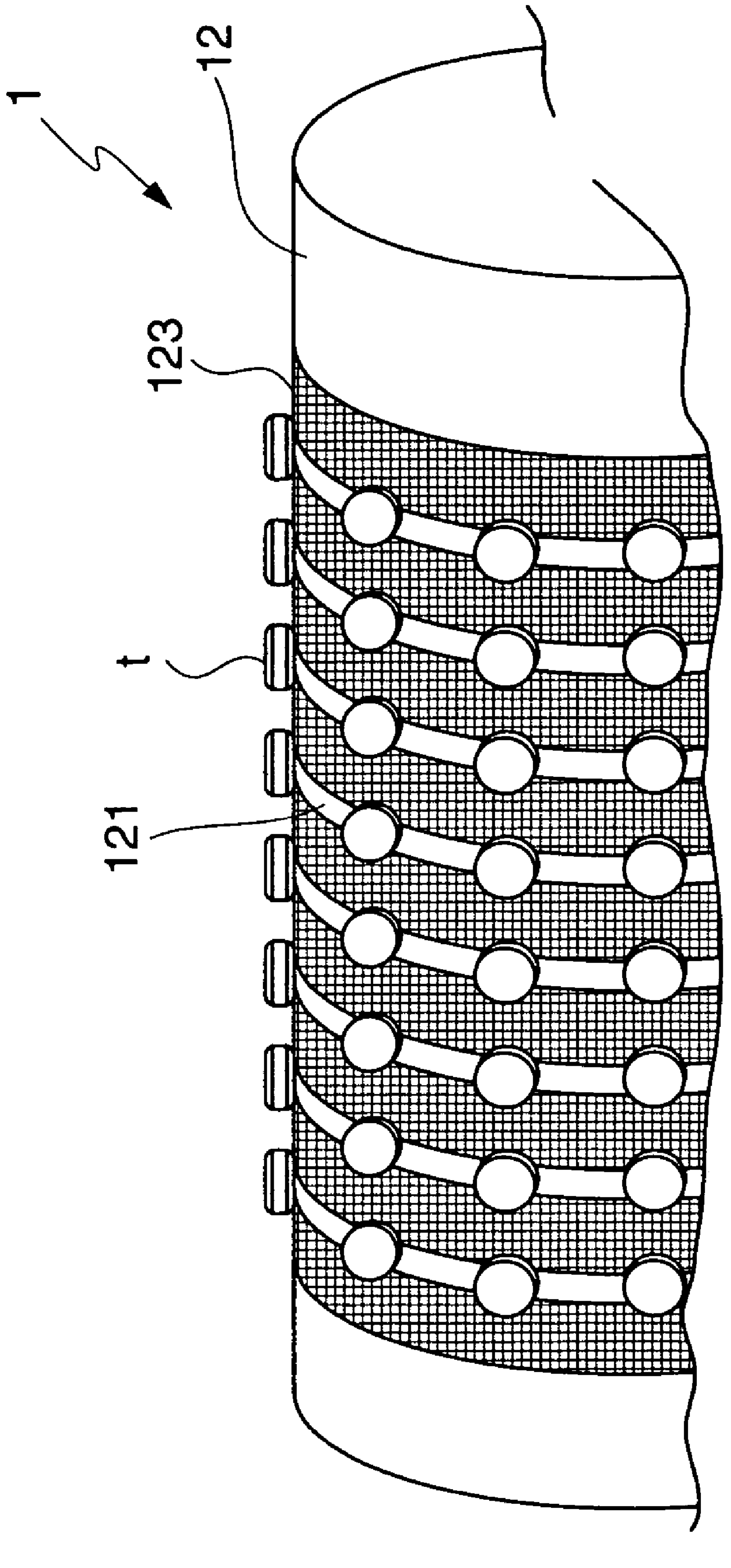
FIG. 8 is a partial enlarged perspective view showing tablets held by the transport drum.

The tablets t fed to the outer peripheral surface of the transport drum 1 are suckingly held on the suction grooves 121 formed on the outer tube 12 of the transport drum 1 each in a state extending between adjacent ones of the rubber rings 123 by a sucking action through the suction holes 122. In this state, the tablets t are transported by rotation of the outer tube 12 as shown in FIG. 5. In this instance, the tablets t transported in a state suckingly held on the transport drum 1 are fed at the same timing onto the suction grooves 121 of the transport drum 1. Consequently, the tablets t form eight tablet rows aligned at equal distances along the circumferential direction of the transport drum 1 as shown in FIG. 8, and the tablets t of the rows are aligned in a row along the axial direction of the transport drum 1.

An image of the tablets t suckingly held and transported by the outer peripheral surface of the transport drum 1 in a state aligned in the circumferential direction and the axial direction is picked up by the image pickup apparatus 14 (refer to FIG. 1) during the transportation of the tablets t. The image is fetched for each row along the axial direction of the transport drum 1, and an appearance of the each tablet t is inspected in terms of the shape, color and so forth from the image. Further, the thickness of the tablets t is measured by the thickness sensor 14*b*. Consequently, mixture of a tablet of a different type or mixture of a defective tablet such as a cracked or broken tablet or a tablet to which a foreign article sticks is detected.

After the appearance and thickness inspections, the tablets t are further transported by rotation of the transport drum 1. Then, as shown in FIG. 5, the tablets t are discharged from the outer peripheral surface of the transport drum 1 by compressed air jetted from the compressed air jetting nozzles 13 disposed in the inner tube 11 at the lowermost portion of the transport drum 1 and are thrown into the temporary reservoir 3. At this time, the eight tablets t held in alignment with the axial direction of the transport drum 1 are thrown at the same time into the temporary reservoir 3. In other words, from the tablet rows held on the eight suction grooves of the transport drum 1, the tablets t are thrown at the same time into the temporary reservoir 3 from each of the tablet rows. Consequently, eight tablets are thrown into the temporary reservoir 3 by one tablet throw-in operation.

The eight tablets t thrown in the temporary reservoir 3 pass through the tablet paths 331 of the gate member 33 for the individual rows and are thrown into the tablet accommodating sections 322 partitioned by the partition blades 321 of the rotary member 32 as shown in FIG. 9(A). At this time, when each of the tablets t passes one of the tablet paths 331, the tablet t is detected by the sensor 332 mounted on the tablet path 331 so that it is confirmed that all of the eight tablets t are thrown into the tablet accommodating sections 322.

Then, the operation described is repeated by a predetermined number of times set in advance so that the tablets t are counted by the predetermined number of times for each number of rows of the tablets t held on the outer peripheral surface of the transport drum 1. For example, if it is set to repeat the operation described above by ten times, then eight tablets t are successively thrown into the tablet accommodating sections 322 of the temporary reservoir 3 by ten times. Consequently, totaling 8×10 tablets t, that is, 80 tablets t, are counted.

After the counting of the predetermined number of tablets t is performed, that is, after the operation described above is repeated by the predetermined number of times, the rotary member 32 of the temporary reservoir 3 is rotated by 90 degrees. Then, in this state, a similar operation to that described above is repeated, and eight tablets t are successively thrown into a next one of the tablet accommodating sections 322 until the predetermined number of tablets t is counted.

Then, the predetermined number of tablets t reserved in the tablet accommodating section 322 of the temporary reservoir 3 are thrown into the plastic bottle k disposed below the feeding chute 34 from an outlet opening provided in the lower wall of the temporary reservoir 3 through the feeding chute 34 when the temporary reservoir 3 is rotated by 180 degrees from the counting position as shown in FIG. 9(A).

Here, empty plastic bottles k are successively fed to a position just below the feeding chute 34 by the bottle transporting mechanism section described hereinabove. In particular, as shown in FIG. 10, empty bottles k are successively fed from the rotating bottle feeding table 42 onto the transport conveyor belt 41*a* and then successively transported by the transport conveyor belt 41*a*. Then, each of the bottles k is stopped once by a stopper not shown at a position just below the feeding chute 34 (a tablet throw-in position in FIG. 10). Then, after the predetermined number of tablets t are thrown into the bottle k from the temporary reservoir 3, the stopped state by the stopper is canceled once. Consequently, the plastic bottle k filled with the tablets t is further transported by the transport conveyor belt 41*a* until it moves to the bottle collection table 43 which rotates at a predetermined speed. Meanwhile, a next empty bottle k is stopped at the position just below the feeding chute 34 (tablet throw-in position in FIG. 10) by the stopper. This operation is repeated in synchronism with the rotating movement of the rotary member 32 of the temporary reservoir 3 so that tablets t are successively fed into the bottles k.

In the present apparatus, if a tablet-filled bottle which includes a tablet of a different type or a defective tablet or contains a wrong number of tablets (insufficient number of tablets) is produced, then this is collected separately. In particular, if a tablet of an abnormal appearance is detected by the inspection by the image pickup apparatus or passage of a tablet t is not detected even once by any of the sensors 332 provided on the gate member 33 of the temporary reservoir 3, then there is the possibility that the pertaining tablet set accommodated in the tablet accommodating section 322 may include a tablet of a different type, a defective tablet suffering from a crack or break or contain an insufficient number of tablets. Therefore, when a defective bottle k' into which the tablet set has been thrown is transported, the defective article discharging door 414 is temporarily opened as indicated by an alternate long and short dash line in FIG. 10. Consequently, the defective bottle k' is introduced to the defective article transport conveyor belt 41*b* past the defective article discharging door 414 and transported along a different path by the defective article transport conveyor belt 41*b* until it is collected separately.

In this manner, according to the inventive counting and feeding apparatus of the present embodiment, small articles such as tablets or capsules are suckingly held on the outer peripheral surface of the transport drum such that a plurality of rows of the small articles aligned along a circumferential direction of the transport drum are formed on the outer peripheral surface of the transport drum and then the small articles are transported by rotation the transport drum. Thereafter, one of the small articles is thrown from each of the rows of the small articles into the temporary reservation means at a predetermined transport position to count the small articles in a unit of the number of rows of the small articles suckingly held on the outer peripheral surface of the transport drum. Then, at a point of time when the predetermined number of small articles is counted, the small articles are fed into a container of a suitable type or a packaging mechanism section from the temporary reservation means.

With the counting and feeding apparatus of the present embodiment, tablets t suckingly held on the outer peripheral surface of the transport drum 1 can be counted in a unit of the number of rows thereof. In particular, in the present embodiment, the tablets t can be aligned along the circumferential direction on the outer peripheral surface of the transport drum 1, and eight such tablet rows can be formed to count the tablets t in a unit of eight tablets. For example, even in a case wherein up to 80 tablets t are counted and then filled and packaged into a plastic bottle k, they can be counted and fed efficiently. Further, from the transport drum 1 on which the tablets t are suckingly held at equal distances in an aligned state, the tablets are thrown into the temporary reservoir 3 with certainty eight by eight at a fixed speed. Therefore, by a comparatively simple operation only of feeding the tablets t from the temporary reservoir 3 into a bottle k at a fixed timing, a predetermined number of tablets can be fed with certainty without particularly requiring a complicated counting operation or control. Further, since a predetermined number of tablets t are fed at a fixed timing from the temporary reservoir 3, also the transporting mechanism for bottles k may be operated at a fixed speed in accordance with the feeding timing, and no complicated control is required.

Further, in the counting and feeding apparatus of the present embodiment, a sensor for detecting a tablet t to be thrown into the temporary reservoir 3 from each row of the tablets t suckingly held on the outer peripheral surface of the transport drum 1 is disposed between the transport drum 1 and the temporary reservation means to inspect a defective count (insufficient feeding). In this instance, even when a number of tablets t corresponding to the number of rows of the tablets t are not detected and insufficient feeding is detected, also this insufficient tablet set is fed in a normal manner to a plastic bottle k and filled or packed into the bottle k, whereafter it is collected separately from normal products. Therefore, also when an insufficient count is detected, the feeding timing from the temporary reservoir 3 is normally fixed, and also the bottle transporting mechanism may be operated at a fixed speed. Thus, appearance of a product containing an insufficient number of tablets can be prevented with certainty without requiring complicated control.

Furthermore, in the counting and feeding apparatus of the present embodiment, since the tablets t are suckingly held on the outer peripheral surface of the transport drum 1 and transported in a stable posture, an image of the tablets t suckingly held on the outer peripheral surface of the transport drum 1 can be picked up by the image pickup apparatus. Thus, an abnormal appearance of a tablet t can be detected from the thus picked up image. Further, the thickness of the tablets t can be measured. Consequently, mixture of a tablet of a different type or mixture of a defective tablet such as a cracked, broken or some other deformed tablet or a tablet to which a foreign article sticks can be prevented.

It is to be noted that the counting and feeding apparatus of the present invention is not limited to the embodiment described above but can be modified in various manners. For example, while the transport drum 1 in the embodiment described above has eight suction grooves to form eight tablet rows, the number of tablet rows to be formed on the transport drum 1 may otherwise be less than 8 or 9 or more. For example, ten tablet rows may be formed so that the tablets may be counted in a unit of ten tablets. Further, if it is intended to change the count value, then the change can be performed in a unit of the number of rows of the transport drum 1 (in the example described above, in a unit of eight rows) by adjusting the number of times by which tablets are thrown into the temporary reservoir 3. However, it is otherwise possible to replace the transport drum 1 with another transport drum which forms a different number of rows. Also it is possible to block a number of tablet feeding paths to the transport drum 1 equal to an arbitrary number of rows by suitable means to adjust the number of rows of tablets t to be formed on the transport drum 1.

Further, the configuration of the transport drum 1, tablet feeding section 2, temporary reservoir 3 and so forth can be modified suitably. For example, the transport drum 1 described above is not limited to that of the type wherein the tablets t are suckingly held on the suction grooves 121, but may be of a different type wherein the tablets t are held in holding pockets formed in an aligned relationship on an outer peripheral surface of the drum. Thus, any transport drum may be used only if the drum holds tablets on an outer circumference thereof and transports the tables. Further, while the embodiment described above is formed as an apparatus which counts and feeds tablets into a plastic bottle k, it may otherwise be formed as an apparatus which, for example, feeds counted tablets t to a packaging mechanism section (packaging apparatus) which performs subdivided packaging such as bagging of counted tablets t. Also the object of counting and feeding is not limited to tablets described above, but the counting and feeding apparatus may otherwise be configured as an apparatus for counting and feeding some other solid medication such as capsules, food products such as supplement or confectionary or other small articles.

Furthermore, the components of the counting and feeding apparatus of the embodiment described above from the tablet feeding section 2 to the transport drum 1 can be suitably used as a feeding apparatus for feeding small articles such as tablets and capsules into pockets of a plastic sheet for PTP packaging in order to PTP package the small articles.

Figure 11:
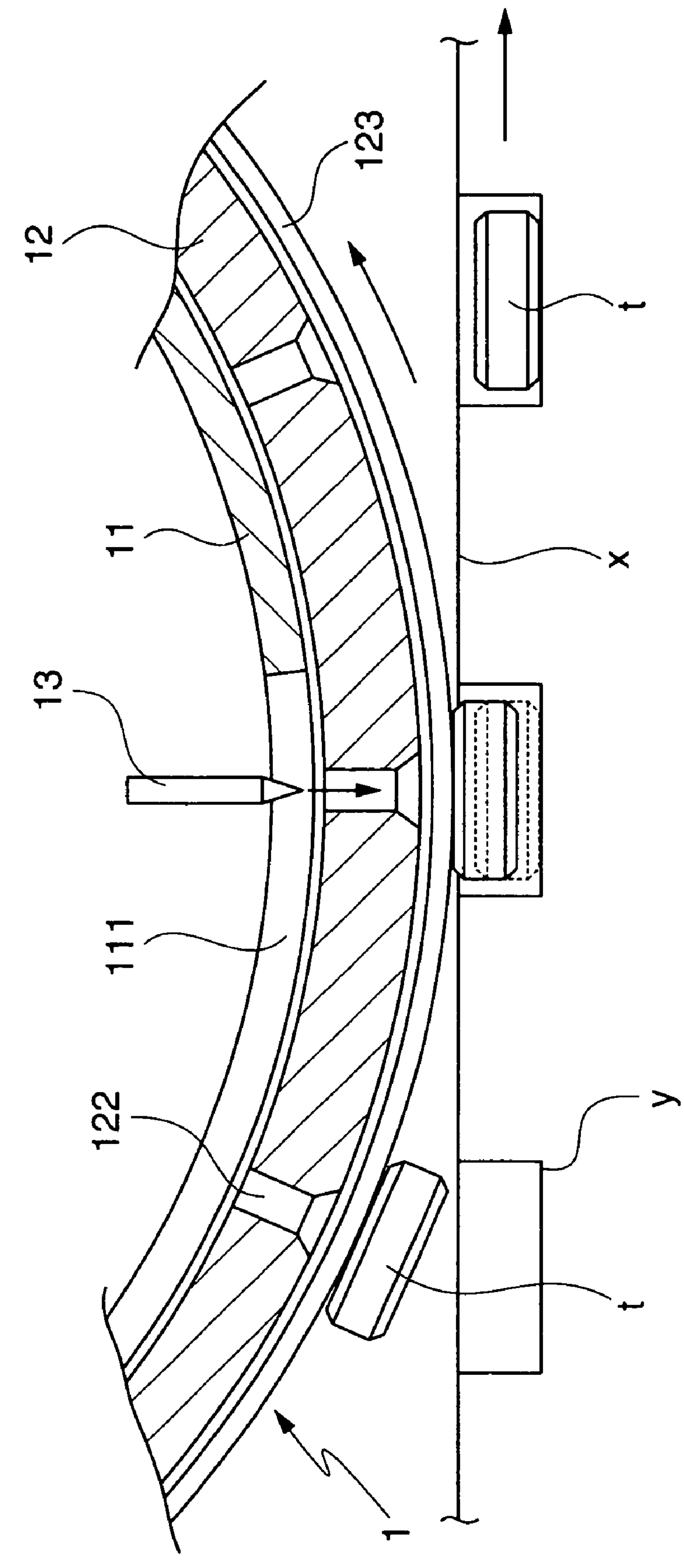
FIG. 11 is a partial schematic enlarged sectional view showing a tablet feeding apparatus to a PTP packaging section configured using components of the counting and feeding apparatus from a tablet feeding section 2 to a transport drum 1.
Figure 12:
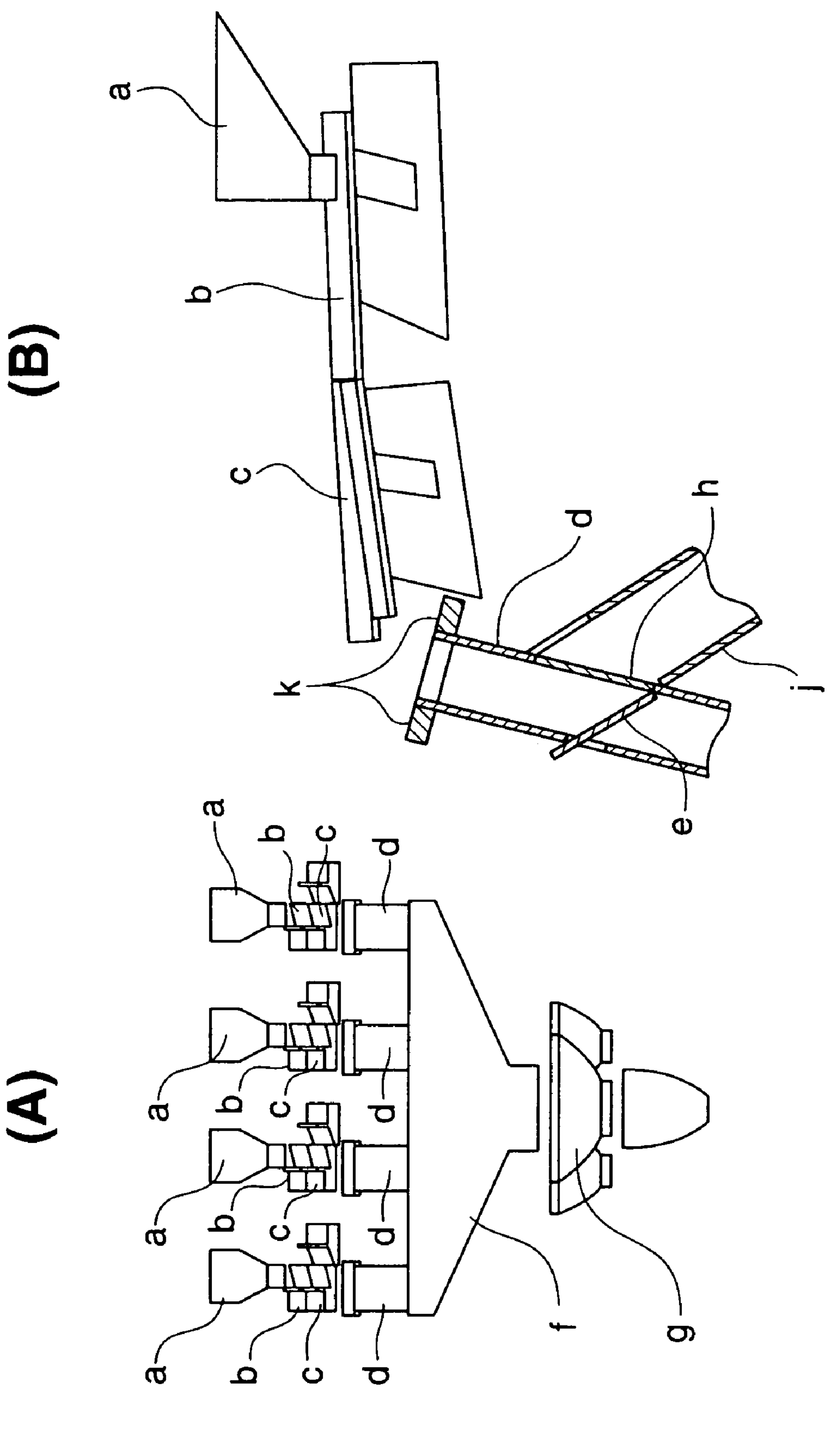
FIG. 12 is a schematic view showing a conventional counting apparatus.
Figure 13:
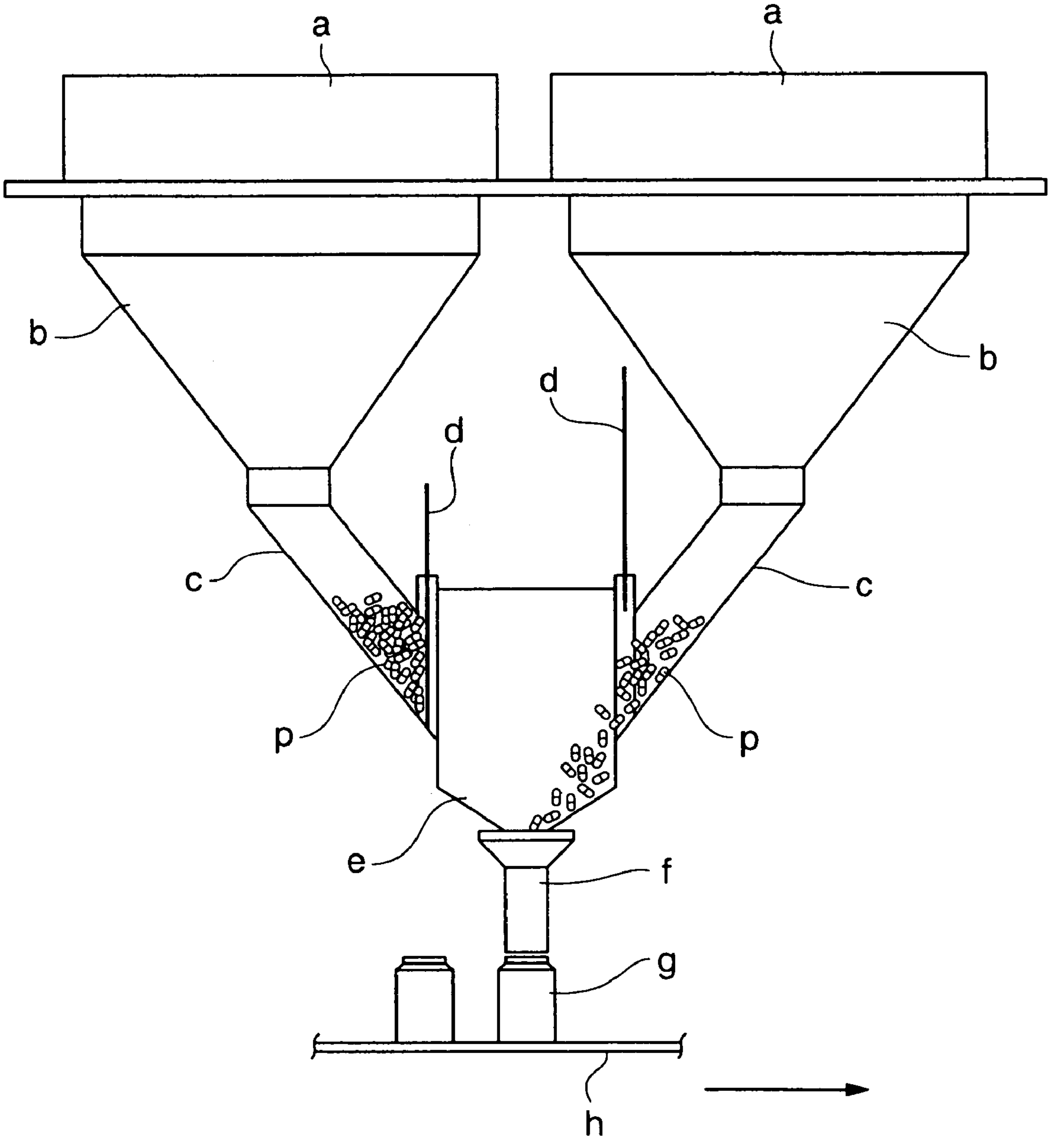
FIG. 13 is a schematic view showing another conventional counting apparatus.
Figure 14:
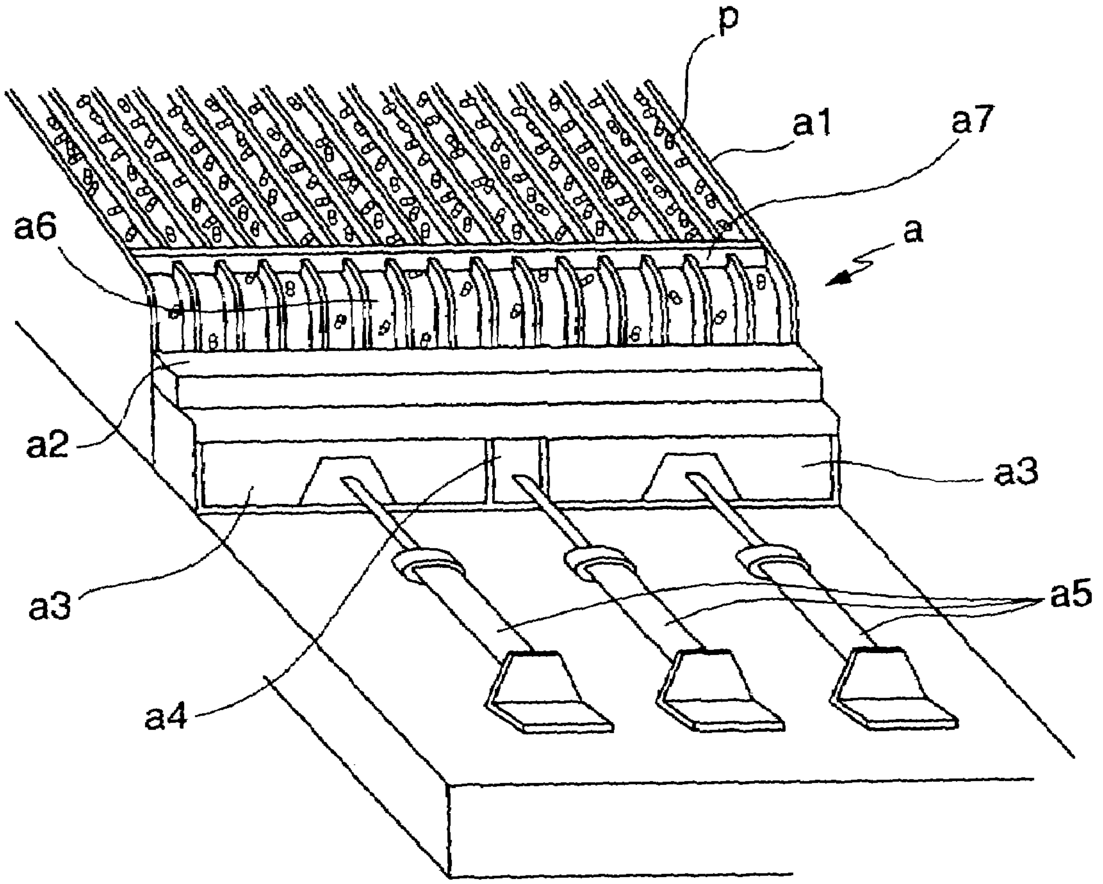
FIG. 14 is a schematic perspective view showing a counting section which composes the counting apparatus.

In particular, a sheet transporting section for transporting a plastic sheet x for PTP packaging is provided below the transport drum 1 in place of the temporary reservoir 3 as shown in FIG. 11. The sheet transporting section transports the plastic sheet x in a state wherein the plastic sheet x is positioned in the proximity of the outer peripheral surface of the transport drum 1. Consequently, a feeding apparatus can be configured which feeds tablets t suckingly held on the outer peripheral surface of the transport drum 1 directly into accommodation recesses (pockets) y of the plastic sheet x.

In this instance, since the transport drum 1 suckingly holds the tablets t in a state wherein they project from the outer peripheral surface of the drum, a tablet t to be thrown into each accommodating recess y of the plastic sheet x from the transport drum 1 is placed into a state wherein it is inserted in the accommodating recess y while it remains in the state suckingly held on the outer peripheral surface of the transport drum 1 as shown in FIG. 11. Then, in this state, the tablet t is transferred into the accommodating recess y by compressed air from the nozzle 13. Therefore, the tablet t is filled in a stable state into the accommodating recess y of the plastic sheet x. Consequently, it is possible to fill tablets with certainty into the accommodating recesses y of the plastic sheet x and perform PTP packaging of them very stably.

As described above, according to the counting and feeding apparatus for small articles of the present invention, even where small articles such as tablets are packaged in a unit of several tens articles into a bottle or a like container, they can be counted and fed very efficiently and accurately. Besides, the small articles can be packaged with certainty using a comparatively simple mechanism, and mixture of a package containing a wrong number of small articles can be prevented to the utmost.

What is claimed is:

1. A counting and feeding apparatus for counting small articles such as solid medication or food articles and feeding the small articles successively by a predetermined number into a container such as a packaging container or a packaging bag or to a packaging mechanism section, characterized in that it comprises:

a transport drum for holding with a suction, the small articles on an outer peripheral surface thereof and rotating at a predetermined speed to transport the small articles;

feeding means for feeding the small articles to the outer peripheral surface of said transport drum, said feeding means including a vibration feeder for feeding the small articles at random;

a communication member having a plurality of communication paths formed thereon, said communication member being connected at a first end thereof to said vibration feeder while a second end of said communication member is positioned in the proximity of the outer peripheral surface of said transport drum, said communication member being disposed in a downwardly inclined relationship from the first end to the second end thereof; and a feed roller disposed in the proximity of an upper face of the second end of said communication member and rotating at a predetermined speed, said vibration feeder successively feeding the small articles into the communication paths of said communication member and moving the small articles from the first end to the second end of said communication member in said communication paths, and said feed roller feeding the small articles at a predetermined speed from said communication paths onto the surface of said transport drum; and temporary reservation means for accepting and reserving the small articles from said transport drum and feeding the small articles to the container or packaging mechanism section, said feeding means feeding the small articles intermittently and successively in a plural number onto the outer peripheral surface of said transport drum so that the small articles are held by suction to the outer peripheral surface of said transport drum such that a plurality of rows of the small articles aligned along a circumferential direction of said drum are formed on the outer peripheral surface of said transport drum and then the small articles are transported by rotation of said transport drum, whereafter one of the small articles is thrown from each of the rows of the small articles into said temporary reservation means at a predetermined transport position, the series of operations being repeated to count the small articles successively in a unit of the number of rows of the small articles until a predetermined number of small articles are reserved by said temporary reservation means, the reserved small articles being fed into the container or packaging mechanism section.

2. The counting and feeding apparatus according to claim 1, wherein said transport drum has a plurality of suction grooves formed on the outer peripheral surface thereof along the circumferential direction which holds and then transports the small articles on said suction grooves.

3. The counting and feeding apparatus according to claim 1 wherein said temporary reservation means has a cylindrical hollow having an upper opening and a lower opening and includes a rotatable member having a plurality of partition blades and disposed in said hollow such that said partition blades partition said hollow into a plurality of accommodation sections for accepting and reserving the small articles from said upper opening and allowing the reserved articles to be discharged from said lower opening by rotation of said rotatable member.

4. The counting and feeding apparatus according to claim 1, wherein said vibration feeder includes a vibration disk which microvibrates in such a manner so as to revolve in a small amount and having a plurality of feed holes formed in an outer circumferential portion thereof, and moving the small articles fed to a central portion of said vibration disk toward the outer peripheral portion of said disk while revolving the small articles by the microvibration so that the small articles are fed from said feed holes into said communication paths of said communication member.

5. A counting and feeding apparatus according to claim 1, wherein a sensor for detecting a small articles thrown into said temporary reservation means from each of the rows of the small articles held by suction to the outer peripheral surface of said transport drum is disposed between said transport drum and said temporary reservation means.

6. A counting and feeding apparatus for small articles according to claim 1, which further comprises one or both of image pickup means and a thickness sensor, said image pickup means picking up an image of the small articles held by suction to the outer peripheral surface of said transport drum to detect an abnormal appearance of any of the small articles.

* * * * *